US012712124B2

(12) United States Patent
Fripp et al.

(10) Patent No.: US 12,712,124 B2
(45) Date of Patent: Aug. 18, 2026

(54) SYSTEM AND METHOD FOR FORMING CAPACITORS IN WELLBORES

(71) Applicant: Halliburton Energy Services, Inc., Houston, TX (US)

(72) Inventors: Michael Linley Fripp, Singapore (SG); Chad Bryant Huffman, Houston, TX (US); Paul J. Jones, Houston, TX (US); Srihari Balasubramanian, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 18/627,067

(22) Filed: Apr. 4, 2024

(65) Prior Publication Data

US 2025/0316420 A1 Oct. 9, 2025

(51) Int. Cl.
*H01G 4/008* (2006.01)
*E21B 41/00* (2006.01)
*H01G 4/012* (2006.01)

(52) U.S. Cl.
CPC ......... *H01G 4/008* (2013.01); *E21B 41/0085* (2013.01); *H01G 4/012* (2013.01)

(58) Field of Classification Search
None
See application file for complete search history.

(56) References Cited

U.S. PATENT DOCUMENTS 3,166,518 A 1/1965 Barnard
4,103,103 A 7/1978 Hizikata
4,730,671 A * 3/1988 Perkins ................. E21B 17/003 166/302
6,672,382 B2 * 1/2004 Schultz ............... E21B 41/0085 340/855.8
9,927,547 B2 * 3/2018 Wood .................... E21B 47/125
10,578,763 B2 * 3/2020 Gabelmann ......... E21B 17/1021
10,775,527 B2 * 9/2020 Wilson .................. E21B 17/003
(Continued)

FOREIGN PATENT DOCUMENTS

EP 0656547 11/1999

OTHER PUBLICATIONS

"PCT Application No. PCT/US2025/013916 International Search Report and Written Opinion", May 21, 2025, 12 pages.
(Continued)

*Primary Examiner* — Timothy J. Dole
*Assistant Examiner* — Esther N Lian
(74) *Attorney, Agent, or Firm* — DeLizio, Peacock, Lewin & Guerra LLP

(57) ABSTRACT

A system and method for installing an energy storage system, the energy storage system including an electrical load and a cement capacitor electrically connected to the electrical load. The cement capacitor includes a first cement electrode; a second cement electrode; and a separator between the first cement electrode and the second cement electrode, wherein the separator electrically insulates the first cement electrode from the second cement electrode. The cement capacitor is charged by passing electricity to the cement capacitor via the electrical load. The cement capacitor is discharged by passing electricity from the cement capacitor to the electrical load.

14 Claims, 12 Drawing Sheets

(56) References Cited

U.S. PATENT DOCUMENTS

| | | | | |
|---|---|---|---|---|
| 11,512,022 | B2 | 11/2022 | Pellenq et al. | |
| 2005/0279495 | A1 | 12/2005 | Chen et al. | |
| 2011/0083838 | A1* | 4/2011 | LaBrecque | G01V 3/20 702/7 |
| 2012/0061095 | A1* | 3/2012 | Capderou | E21B 34/066 166/321 |
| 2012/0293179 | A1* | 11/2012 | Colombo | G01V 3/26 324/339 |
| 2014/0111349 | A1 | 4/2014 | Roberson et al. | |
| 2014/0124195 | A1* | 5/2014 | Tahoun | E21B 34/12 166/250.01 |
| 2014/0320301 | A1 | 10/2014 | Hudson | |
| 2016/0237790 | A1* | 8/2016 | Williams | E21B 47/18 |
| 2017/0131226 | A1 | 5/2017 | Boul et al. | |
| 2019/0218144 | A1* | 7/2019 | Pellenq | H01G 11/36 |
| 2021/0238994 | A1* | 8/2021 | Singh | E21B 33/16 |
| 2021/0276921 | A1* | 9/2021 | Pellenq | C04B 24/383 |

OTHER PUBLICATIONS

Chanut, et al., "Carbon-Cement Supercapacitors as a Scalable Bulk Energy Storage Solution", Mar. 23, 2023, 7 pages.

* cited by examiner

TEC TO VALVE
102
401
412
406
116
ENERGY GRID 242
ELECTRONICS
409
402
408
401
LOAD 240
116
404
118
410
117
106
TEC TO SURFACE
110
400

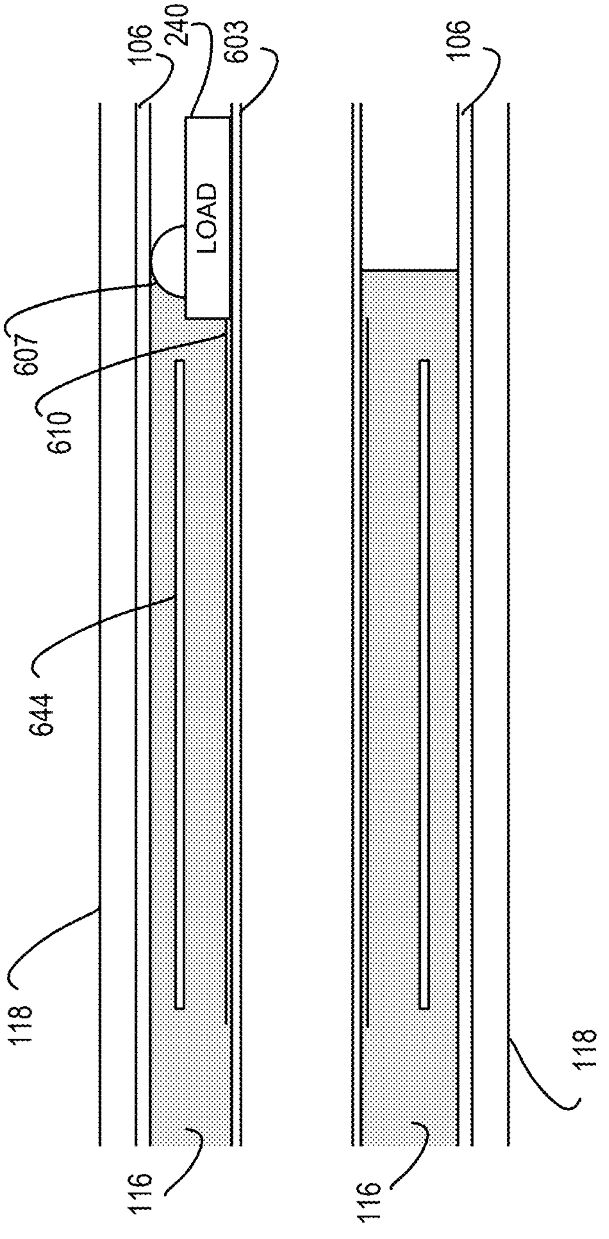
106
240
603
106
LOAD
607
610
644
118
118
116
116
FIG. 6
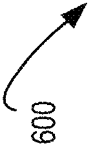
600

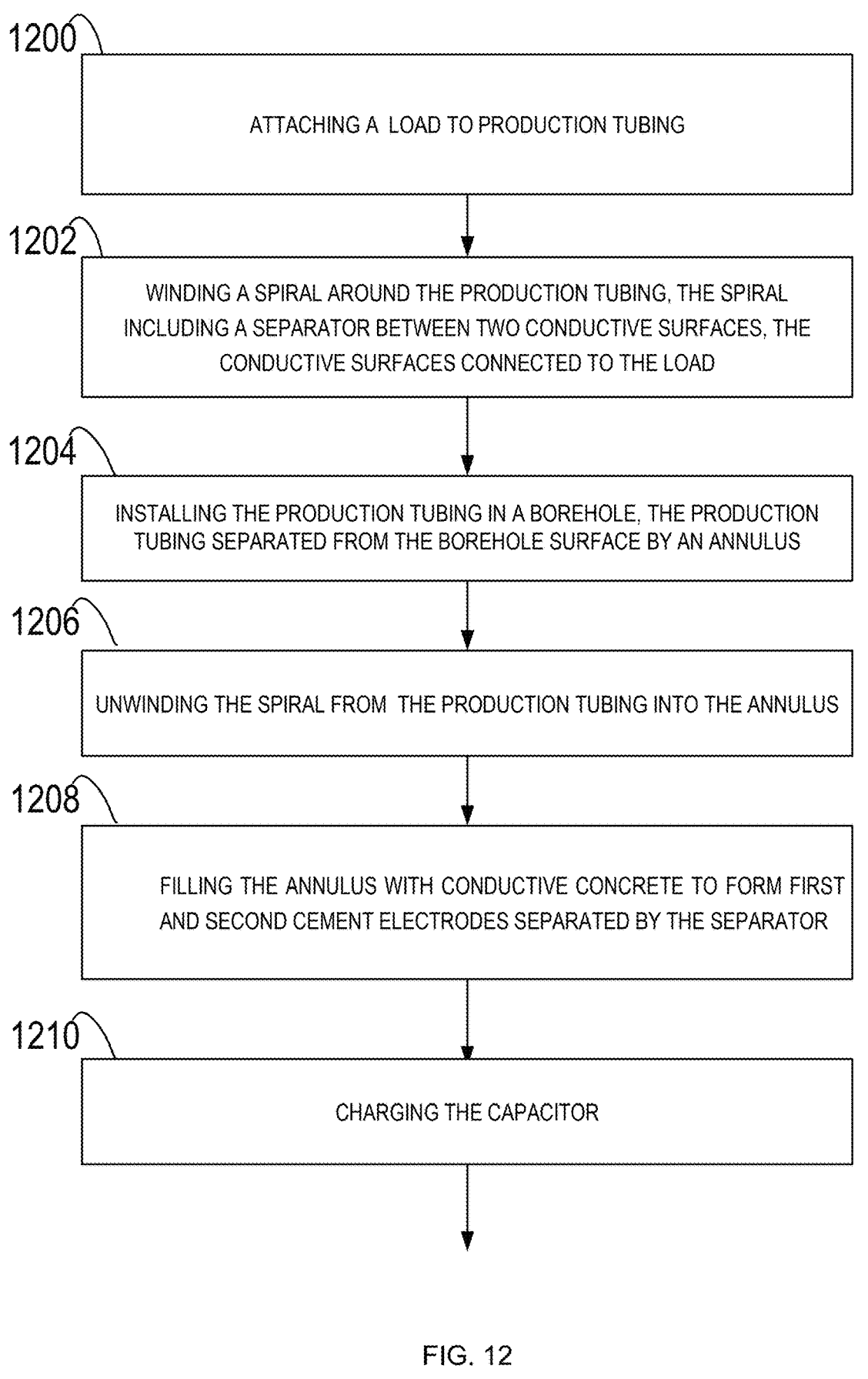

1200 ATTACHING A LOAD TO PRODUCTION TUBING

1202 WINDING A SPIRAL AROUND THE PRODUCTION TUBING, THE SPIRAL INCLUDING A SEPARATOR BETWEEN TWO CONDUCTIVE SURFACES, THE CONDUCTIVE SURFACES CONNECTED TO THE LOAD

1204 INSTALLING THE PRODUCTION TUBING IN A BOREHOLE, THE PRODUCTION TUBING SEPARATED FROM THE BOREHOLE SURFACE BY AN ANNULUS

1206 UNWINDING THE SPIRAL FROM THE PRODUCTION TUBING INTO THE ANNULUS

1208 FILLING THE ANNULUS WITH CONDUCTIVE CONCRETE TO FORM FIRST AND SECOND CEMENT ELECTRODES SEPARATED BY THE SEPARATOR

1210 CHARGING THE CAPACITOR

FIG. 12

SYSTEM AND METHOD FOR FORMING CAPACITORS IN WELLBORES

BACKGROUND

As part of hydrocarbon recovery operations, a wellbore may be formed in a subterranean formation. The wellbore may be used to extract produced hydrocarbon material or other suitable material. In one example approach, an operator may, for instance, drill the wellbore using a drilling system that may include a drill bit and other suitable tools or components for forming the wellbore. During drilling, the drilling system may change the course (e.g., speed, direction, etc.) of the drill bit to form a wellbore that may not be purely vertical. In one such example, the operator places a material such as cement in the annulus between the casing and the formation The cement sheath may provide a hydraulic seal that establishes zonal isolation, preventing fluid communication between producing zones in the borehole and blocking the escape of fluids to the surface.

BRIEF DESCRIPTION OF THE DRAWINGS

Embodiments of the disclosure may be better understood by referencing the accompanying drawings.

FIG. 6 is a cross-sectional view of another energy storage system for use in a borehole, according to aspects of the present disclosure.

FIG. 12 is a flowchart illustrating another method of charging a cement capacitor, according to aspects of the present disclosure.

Like reference numbers and designations in the various drawings indicate like elements.

DETAILED DESCRIPTION

Figure 1:
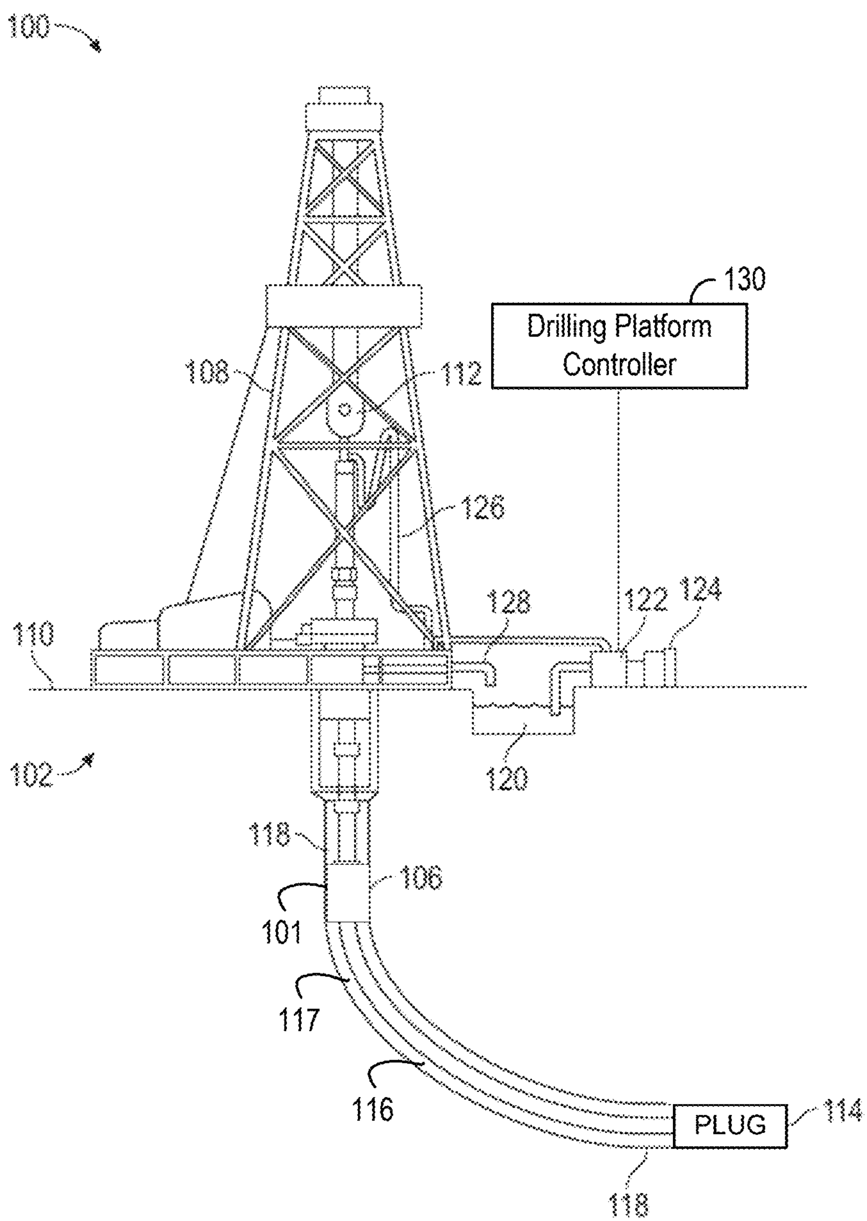
FIG. 1 is an elevation view in partial cross section of an example well system that includes an energy storage system, according to aspects of the present disclosure.

The description that follows includes example systems, methods, techniques, and program flows that embody embodiments of the disclosure. Unless otherwise specified, use of the terms "connect," "engage," "couple," "attach," or any other like term describing an interaction between elements is not meant to limit the interaction to a direct interaction between the elements and may also include an indirect interaction between the elements described. Unless otherwise specified, use of the terms "up," "upper," "upward," "uphole," "upstream," or other like terms shall be construed as generally away from the bottom, terminal end of a well: likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

As noted above, drilling operations may introduce a change in the operation (e.g., speed, direction, etc.) of the drill bit to change the trajectory of the drill string, forming a wellbore that may not be purely vertical. Sometimes, the change in operation will introduce a dogleg, a section of a borehole where the trajectory changes rapidly. Thoughtfully planned and drilled, doglegs are part of an optimized borehole, avoiding problematic formations and maintaining the right drilling angle to reach a desired zone.

Operating parameters such as weight on bit (WOB), rotations per minute (RPM) of the bit, and flowrate may be adjusted in real time to steer a drill string. For example, the operating parameters may be adjusted to increase or decrease the dogleg capability of the drill string. At the same time, however, operating parameters (such as WOB, RPM, and flowrate) may be adjusted to maximize the rate of drilling, to manage a safe operating envelope and for telemetry and data transmission.

Cement is used in a wellbore to provide a hydraulic seal that establishes zonal isolation, preventing fluid communication between producing zones in the borehole and blocking the escape of fluids to the surface. In one example approach, when the wellbore reaches the desired depth, the drill string is removed, and a steel casing string lowered to the bottom of the borehole. A cement slurry is pumped into the borehole, where it displaces drilling fluid. The cement forms a sheath that anchors and supports the casing string and protects the steel casing from corrosion by formation fluids. In some such example approaches, the cement slurry includes a conductive cement, as described in further detail below.

Certain aspects and features of the present disclosure relate to energy storage in a wellbore and, in particular, to the use of conductive cement for short-term energy storage. In one example approach, a cement slurry is modified so that electrical energy may be stored in the cement. In one such example approach, conductive carbon is added to the cement so that the cement holds an electrical charge, creating conductive cement. In one example approach, the wellbore construction may be modified with a non-conducting separator so that the conductive cement does not short circuit. To-date, no one has used conductive cement in a wellbore to form capacitors. In addition, no one has stored electrical energy in the zonal isolation of a wellbore.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Example Well System

FIG. 1 is an elevation view in partial cross section of an example well system that includes an energy storage system, according to aspects of the present disclosure. In the example shown in FIG. 1, the well system 100 includes a casing string 106 extending through a wellbore 118 in a subterranean formation 102, such as a subsea well or a land well. Example embodiments are not limited to only drilling an oil well. Some implementations may also encompass natural gas wellbores, other hydrocarbon wellbores, or wellbores in general. Further, some implementations may be used for the exploration and formation of geothermal wellbores intended to provide a source of heat energy instead of hydrocarbons.

In the example shown in FIG. 1, a casing string 106 is attached to a derrick 108 and a bottom plug 104: the bottom plug 104 may be positioned or otherwise arranged at the bottom of the casing string 106 to separate the cement slurry from the fluid in the borehole 118. The derrick 108 may be located at the surface 110 and may, in some example approaches, include a kelly 112 connected to casing string 106: the kelly 112 may be used, for instance, to lower and raise the casing string 106. The kelly 112 may also be used to lower and raise the liners, production tubing, separators, conductive surfaces and electrical lines discussed below.

In the example shown in FIG. 1, well system 100 includes a mud tank 120 and a mud pump 122. The mud pump 122 may be powered by an adjacent power source, such as a prime mover (or motor) 124. In drilling operations, drilling mud may be pumped out of the mud tank 120, through a standpipe 126, which feeds the mud through a drill string to a rotary steerable system (not shown), or other suitable components of the well system 100, and on to a drill bit attached to the drill string. The mud may, in some examples, cool the drill bit.

After exiting the drill bit or other suitable component, the mud may circulate back to the surface 110 via an annulus 117 defined between the wellbore 118 and the drill string. The returning mud transports cuttings from the wellbore 118 into the mud tank 120 and aids in maintaining the integrity of the wellbore 118. For example, cuttings and mud mixture passed from the annulus through the flow line 128 may be processed such that a cleaned mud may be returned down hole through the standpipe 126.

In some example approaches, a drilling platform controller 130 controls a portion of the drilling process. In some such example approaches, drilling platform controller includes automated drilling: the drilling controller 130 includes the ability to identify the status and performance level of drilling, detect abnormalities, if any, to analyze contributing factors to the abnormalities detected and to offer suggestions and decisions accordingly.

When the wellbore 118 reaches the desired depth, the drill string is removed and a steel casing string 106 lowered to the bottom of the borehole. In some example approaches, a plug 114 at the bottom of the borehole 118 separates the casing 106 from the formation fluids. A conductive cement slurry is pumped through the casing string 106 into the borehole 118, where it displaces drilling fluid in the annulus 117. The conductive cement forms a sheath that anchors and supports the casing string 106, protects the steel casing 106 from corrosion by formation fluids, and provides short-term energy storage within a cement capacitor 101 formed via the ca. The conductive cement slurry is described in further detail below.

In one example approach, a conductive carbon is added to the cement so that the cement holds an electrical charge, creating conductive cement. In one example approach, the wellbore construction may be modified with a non-conducting separator so that the conductive cement does not short circuit. To-date, no one has used conductive cement in a wellbore to form capacitors 101 via cement electrodes. In addition, no one has stored electrical energy in the zonal isolation of a wellbore.

Figure 2:
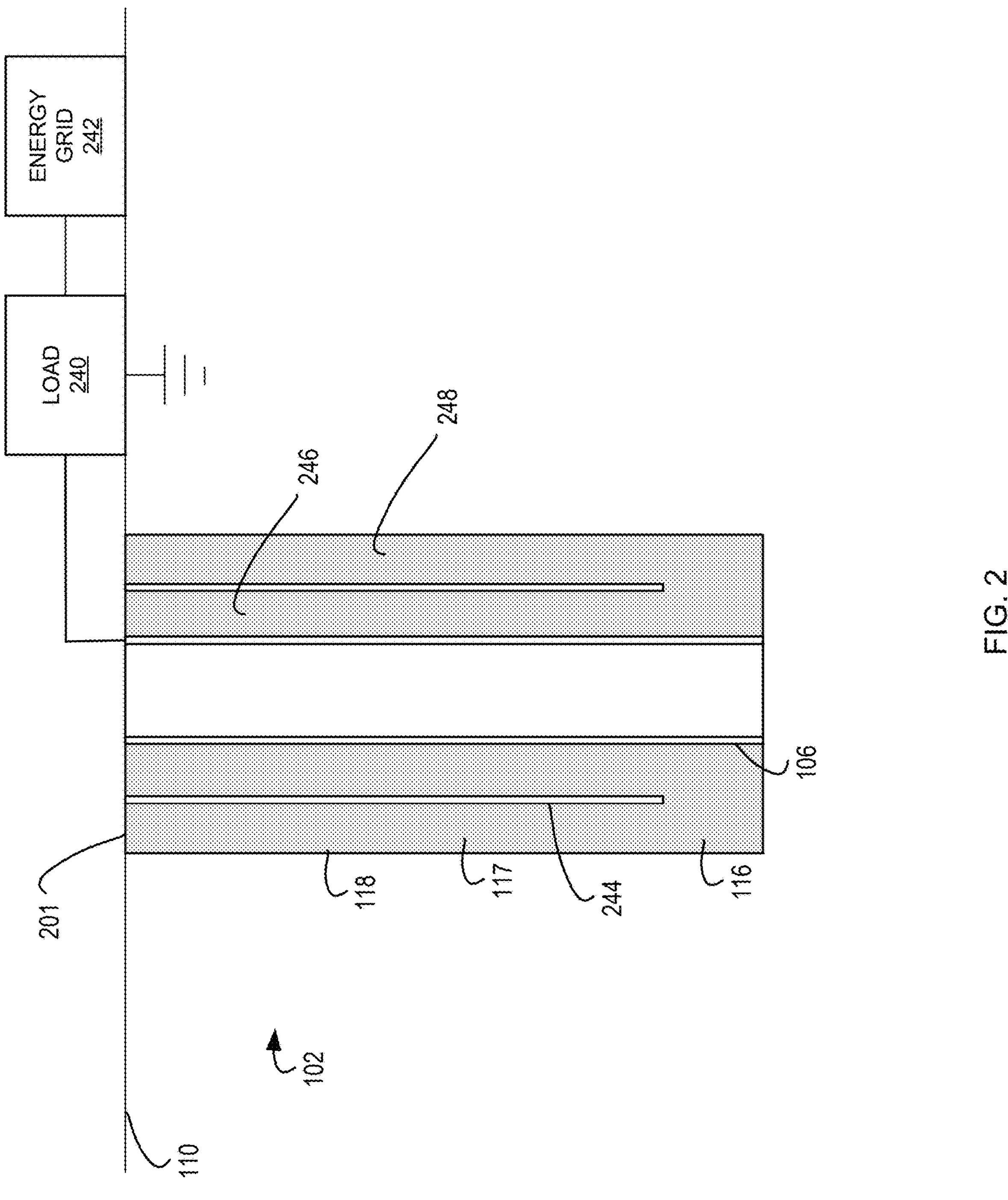
FIG. 2 is a cross-sectional view of an energy storage system for use in a borehole, according to aspects of the present disclosure.

FIG. 2 is a cross-sectional view of an energy storage system for use in a borehole, according to aspects of the present disclosure. In the example shown in FIG. 2, borehole 118 includes a casing string 106 separated from the borehole 118 by an annulus 117. A separator tube 244 is placed in annulus 117 around the casing string 106. In one example approach, as shown in the cross-sectional view of FIG. 2, the volume inside and outside of the separator tube 244 is filled with conductive cement. The result is that the casing is the current collector for one electrode while the formation 102 is the ground electrode. That is, the ground is the ground.

In a move to a low-carbon energy future, electrical energy for surface applications of energy storage system 200 may be stored within a capacitor 201 formed in the cement sheath of the wellbore 118. In one example approach, energy storge in the cement sheath is accomplished by creating cement electrodes and placing a separator between those electrodes. In one example approach, the cement electrodes are created by mixing carbon black into the cement. The carbon black forms along the grains within the cement. When there is sufficient carbon black in the cement (which, in some example approaches, ranges from approximately 6-10% by weight but, in other example approaches, may range from 0.1% to 25% by weight), then carbon black creates chains of electrical conductivity within the cement. These chains of electrical conductivity within the cement combine to form a cement electrode with the electrical equivalence of a very large surface area. This combination of cement with the carbon black is termed "high surface area cement." A high surface area cement may also be created through the addition of forms of carbon other than carbon black, including graphite, carbon nanotubes, charcoal, and graphene. A high surface area cement may also be created through the addition of metal nanotubes and foamed metal particulates. In one example approaches, the particulates are less than 5 microns in diameter and have a specific surface area greater than 1 square meter per gram. In some such example approaches, the specific surface area of the particulates may be greater than approximately 10 square meters per gram.

The cement capacitor is created when the two cement electrodes are separated by an electrical separator. In one example approach, as shown in the cross-sectional view of FIG. 2, the volume inside and outside of the separator tube 244 is filled with the high surface area cement. An electrical load 240 is connected to an energy grid 242. When excess energy is produced on the energy grid 242, power is provided to the casing string 106 and the casing string 106 is charged to a voltage. When there is insufficient power for the load 240, such as at night, then the charged cement returns energy to load 240.

In the example approach of FIG. 2, the separator tube 244 allows ions to pass through the material but blocks electrons from passing. In some such example approaches, the separator tube 244 is porous enough to allow salt water to pass through the tube while also insulating the conductive cement 246 in between the casing string 106 and the tube 244 from the conductive cement 248 between the separator tube 244 and the wall of borehole 118. Examples of separators include fibrous materials (like glass mat, paper, woven polymer) and porous solid materials (like porous polytetrafluoroethylene (PTFE)). The woven materials may be partially bonded to increase structural integrity. In one such approach a mat of glass fibers may be partially bonded using polyether ether ketone (PEEK). In another example approach, the separator tube 244 is not only nonconductive but also nonporous and does not allow ions or salt water to pass through the material. Examples of nonporous separators include nonporous polymers (like nonporous PTFE and nonporous PEEK), nonporous epoxy, and nonporous ceramic. Fiber may be used to reinforce the nonporous separator, such as by using a nonporous fully bonded fiberglass material.

Note that the energy storage system 200 of FIG. 2 is for energy storage in subterranean formations 102. The approach may, however, be used to store energy for both surface and subsurface applications.

Figure 3:
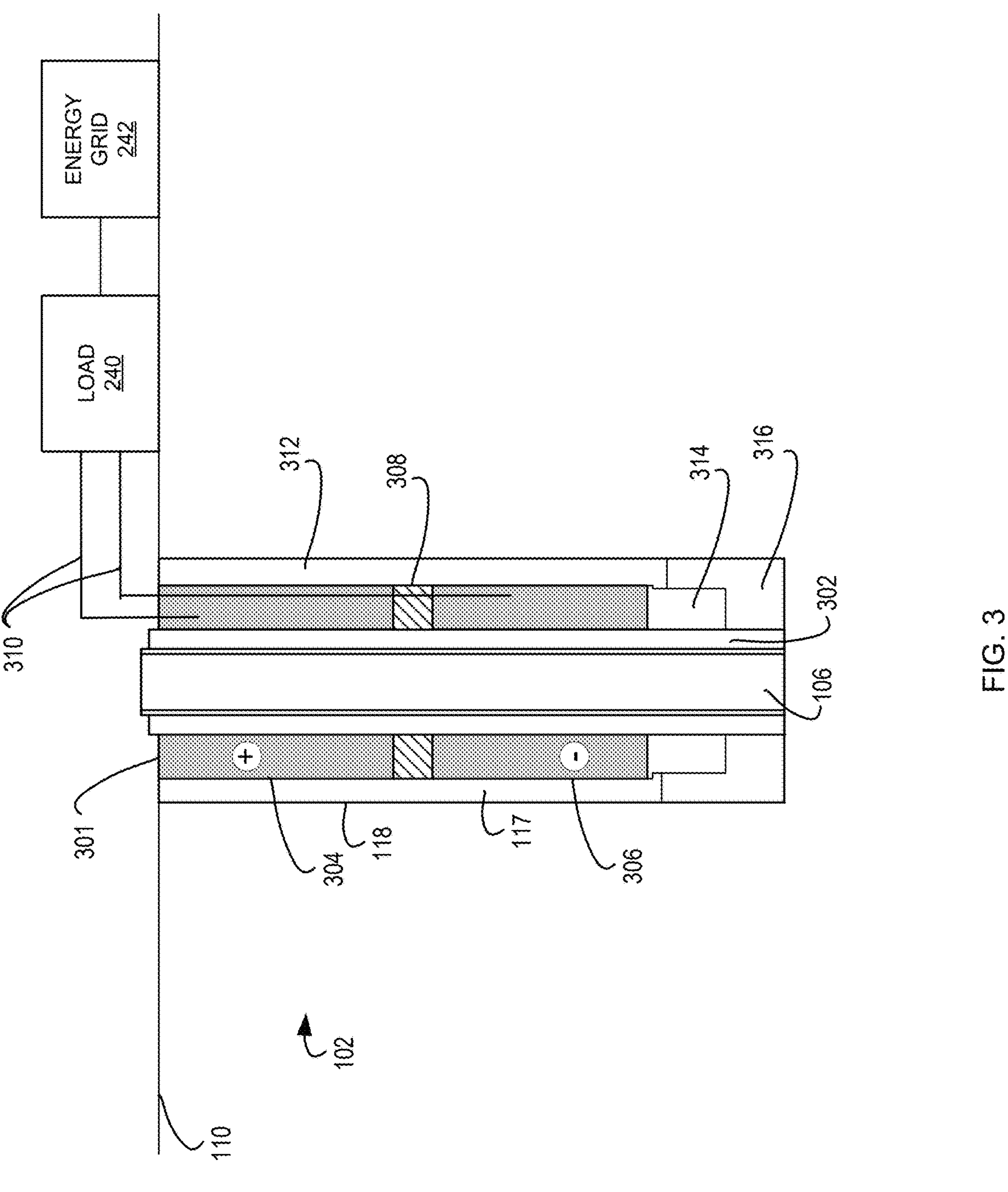
FIG. 3 is a cross-sectional view of another energy storage system for use in a borehole, according to aspects of the present disclosure.

FIG. 3 is a cross-sectional view of another energy storage system for use in a borehole, according to aspects of the present disclosure. In the example shown in FIG. 3, the capacitor 301 includes a conductive casing 106 surrounded by a first insulating sheath 302, a conductive cement disk 304, a conductive cement disk 306 and a separator 308 interposed between disk 304 and 306. In one example approach, insulating sheath 302 is nonconducting fiberglass. In another example approach, insulating sheath is a material coated with a non-conductive material.

In one example approach, conductive cement disk 304 and a conductive cement disk 306 are electrically isolated from each other by separator disk 308. In one example approach, the conductive cement disks (304, 306) are formed from, for example, a high surface area cement. In one such example approach, conductive cement disk 306 is installed above a surface shoe of energy storage system 300.

The separator disk 308 allows ions to pass through the material but blocks electrons from passing from one conductive cement disk to the other. In one example approach, the separator 308 is porous enough to allow salt water to pass between disk 304 and disk 306 while also insulating the disks 306 from each other. As noted above, examples of separators 308 include fibrous materials (like glass mat, paper, woven polymer) and porous solid materials (like porous polytetrafluoroethylene (PTFE)). The woven materials may be partially bonded to increase structural integrity. In one such approach a mat of glass fibers may be partially bonded using polyether ether ketone (PEEK). Nonporous options for separator disk 308 may be used as well, as noted in the discussion of FIG. 2 above.

In one example approach, the disks 304 and 306 are of opposite polarity and are electrically connected to the load 240 via electrical lines 310 encapsulated in tubing (TEC). When excess energy is produced on the energy grid 242, power is provided to the conductive cement disks 304 and 306 and capacitor 301 is charged to a voltage. Shaped electrodes may be connected to the electric lines 310 including electrodes shaped like a mesh, a plate, a cylinder, or a washer. When there is insufficient power for the load 240, such as at night, then the charged cement returns energy to load 240. In one example approach, the separator may be porous to enable ionic brine movement while non-conductive to prevent shorting from electron movement.

In one example approach, as shown in FIG. 3, a surface casing 312 placed in the annulus 117 between the high surface area cement sections 304 and 306 and the surface of the borehole 118 acts as additional insulation for capacitor 301. In one such example approach, the surface casing 312 may be conventional nonconductive cement. In another such example approach, the surface casing 312 may be an insulating foam.

In one example approach, as shown in FIG. 3, a surface casing 314 beneath conductive cement disk 306 fills the annulus 117 between the insulating sheath 302 and the surface of borehole 118. In one example approach, the surface casing 312 may be conventional nonconductive cement. In another such example approach, the surface casing 308 may be an insulating foam.

In one example approach, section 316 includes interior tail cement brought to the top of cement (TOC) above the surface shoe. The cement may have low conductivity and act as an insulator.

Figure 4:
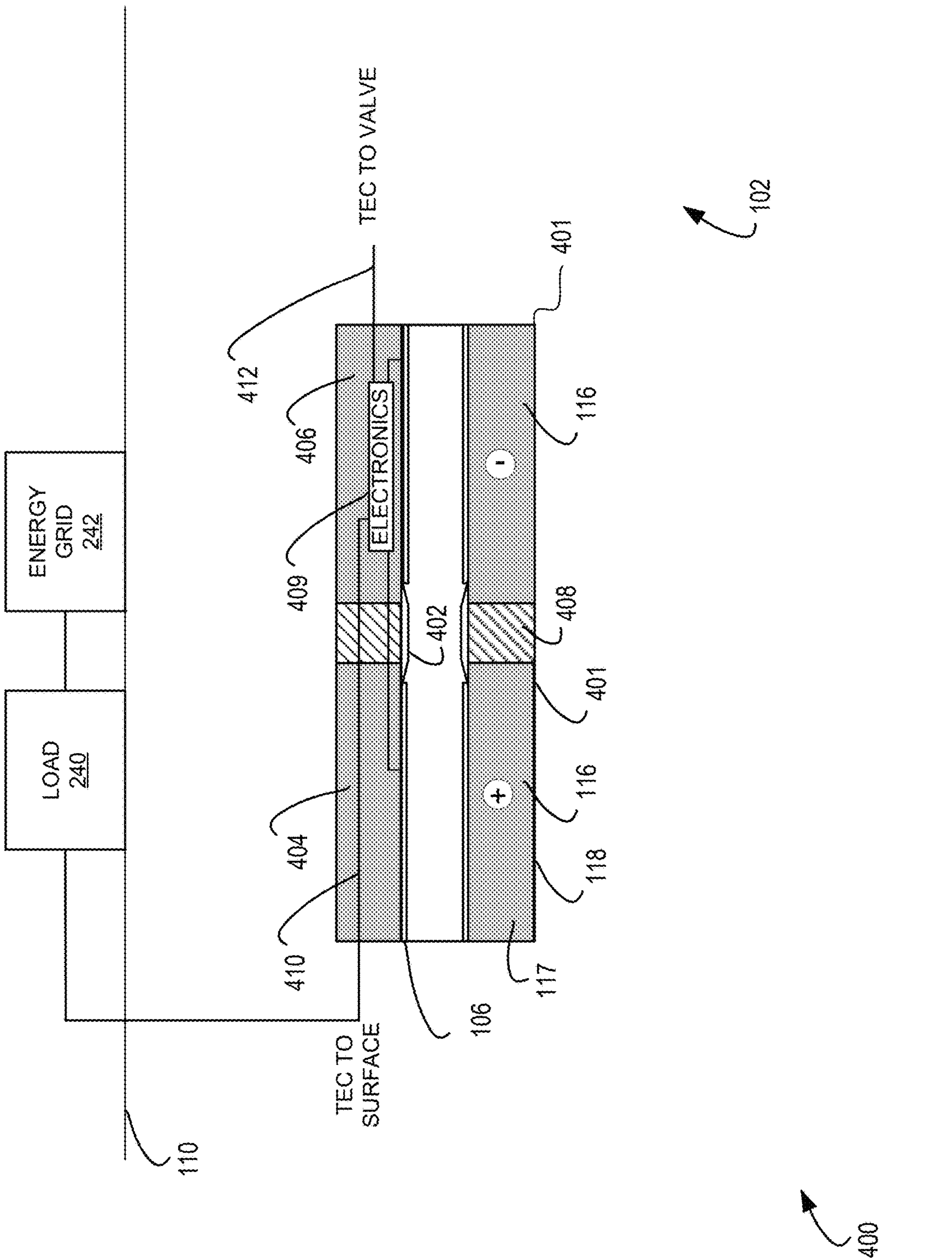
FIG. 4 is a cross-sectional view of another energy storage system for use in a borehole, according to aspects of the present disclosure.

FIG. 4 is a cross-sectional view of another energy storage system for use in a borehole, according to aspects of the present disclosure. In the example shown in FIG. 4, the cement capacitor 401 includes conductive cement 116 separated by a separator 408. In some example approaches, the separator 408 may be a section of cement that has a low concentration of high surface area particles. In some example approaches, the separator 408 may be a porous or a nonporous insulator as discussed above.

In the example shown, the electronics 409 provide connection to the casing 106 on either side of the insulating subsection 402. In this configuration, each electrically isolated section of casing 106 serves as the current collector for the electrodes 404 and 406, respectively. Each electrode consists of a section of casing 106 and a section of the high surface area cement 116. In one such example approach, the electronics 409 also serve to charge the cement capacitor 401 either from a line from a power source (like the surface or from batteries) or from a line from a downhole generator. The electrical lines 410 and 412 are encapsulated in tubing, TEC. In one example approach, the separator 408 may be porous to enable ionic brine movement while non-conductive to prevent shorting from electron movement.

Figure 5:
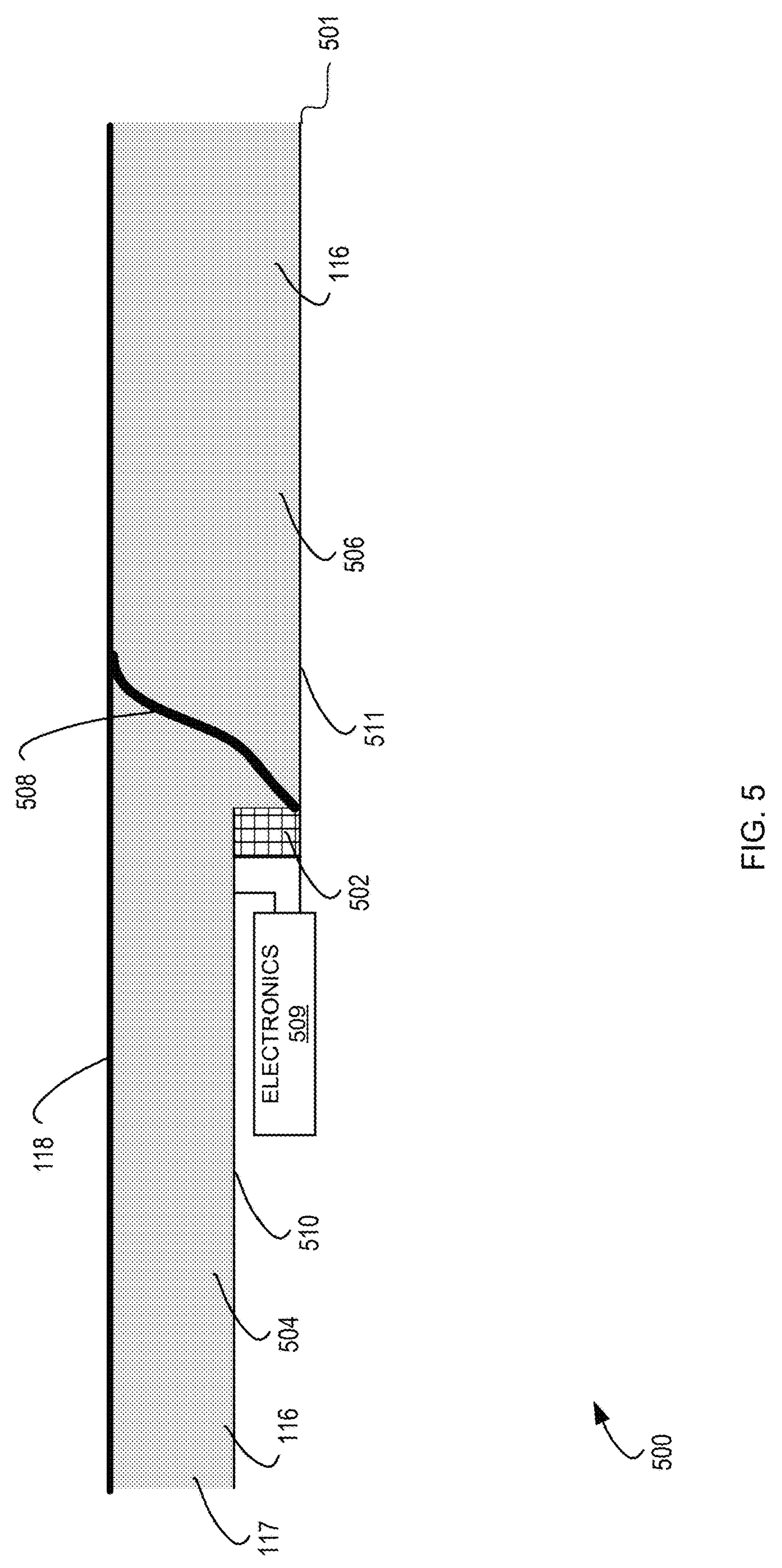
FIG. 5 is a cross-sectional view of another energy storage system for use in a borehole, according to aspects of the present disclosure.

FIG. 5 is a cross-sectional view of another energy storage system for use in a borehole, according to aspects of the present disclosure. In the example shown in FIG. 5, the cement capacitor 501 includes conductive cement 116 separated by a separator 508. In one configuration, as shown in FIG. 5, the separator 508 is a configured as a wiper that allows the conductive cement 116 to flow around the separator 508 in annulus 117 of borehole 118. Again, in one example approach, the separator 508 may be porous to enable ionic brine movement from cement electrode 504 to cement electrode 506 while non-conductive to prevent shorting from electron movement. In another example approach, the separator 508 may include a nonporous insulator as discussed above. In the example shown in FIG. 5, an electrical insulator sub 502 separates the two sections of conductive cement by acting as an insulator between sides of each capacitor section.

In one example approach, cement electrode 504 is electrically connected through conductive surface 510 to electronics 509. Similarly, cement electrode 506 is electrically connected through conductive surface 511 to electronics 509. In one such example approach, conductive surfaces 510 and 511 are part of a first and second conductive casing, respectively.

In another example approach, the separator 508 and the separator 408 may be a packer-like element that is self-expanding or compression set. The material of the separator 508, 408 may be a solid material like a foam, or sponge, or porous polymer. The separator 508, 408 may also be fibrous such as a mesh or weave.

FIG. 6 is a cross-sectional view of another energy storage system for use in a borehole, according to aspects of the present disclosure. As shown in FIG. 6, the radial configuration may be created downhole. A tube of separator 644 may be created as part of the installation and inserted between production tubing 603 and casing 106 in borehole 118. Production tubing 603 may be conductive or a separate conductive surface 610 may be used with nonconductive production tubing 603 as shown. In one such example approach, conductive surface 610 is adjacent to and surrounds all or most of the surface of production tube 603. In one example approach, the electrical load 240 is downhole and is connected through an electrical contact 607 to the conductive casing 106 and to conductive surface 610. In some example approaches, the casing 106 is not conductive and a separate electrical line connects the load 240 to energy grid 242.

Figures 7A, 7B:
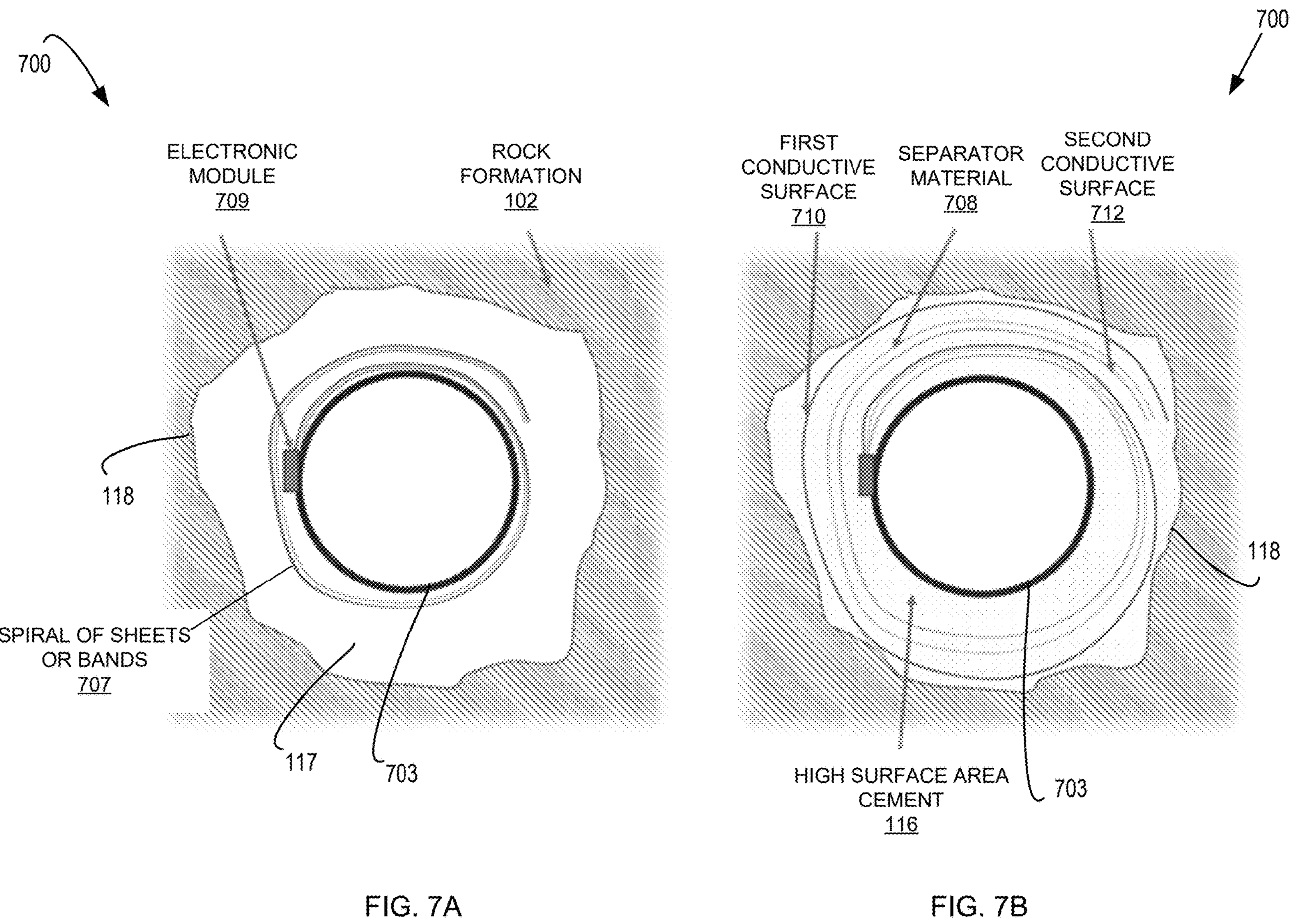
FIGS. 7A and 7B are cross-sectional views of another energy storage system for use in a borehole, according to aspects of the present disclosure.

FIGS. 7A and 7B are cross-sectional views of another energy storage system for use in a borehole, according to aspects of the present disclosure. In the example approaches of FIGS. 7A and 7B, the current collectors are conductive surfaces 710, 712 that spiral outward from the oilfield tubular (pipe 703). As shown in the example approach of FIG. 7A, a spiral 707 of sheets or bands of material, when deployed, is tightly wound around the pipe 703 to aid installation of the tubular. In one example approach, the sheets include two conductive surfaces 710, 712 separated by separator material 708. The conductive surfaces 710, 712 may be sheet metal, such as stainless steel or a carbon steel. They may also be conductive polymers, such as a carbon fiber composite or a carbon-filled PEEK. The separator material 708 may be implemented as discussed above. In some example approaches, the separator material 708 may include a glass fiber composite or another type of polymer such as PEEK or PTFE. The conductive surfaces 710 and 712 and separator material 708 may have internal stiffness and may be biased to spring outward when they are no longer restrained. In another example approach, the spiral 707 includes bands of conductive surfaces separated by the separator material.

As shown in FIG. 7B, the spirals are no longer tightly wound and spiral outward from the electronics module 709 into the annular region 117 between the pipe 703 and the surface of borehole 118 in rock formation 102. When high surface area cement 116 is circulated around the pipe 703, the space between the spiraled electrodes and the spiraled separator is filled with the high surface area cement 116, creating a cement capacitor. Note that FIG. 7B shows a single spiral around the pipe. In other example approaches, the spiral 707 may have multiple starting points along the pipe 703. In some such example approaches, each spiral 707, when deployed, does not make a complete revolution around pipe 703. In other words, the current collectors 710 and 712 may, when deployed, look more like a starfish than the nautilus as drawn.

Figure 8:
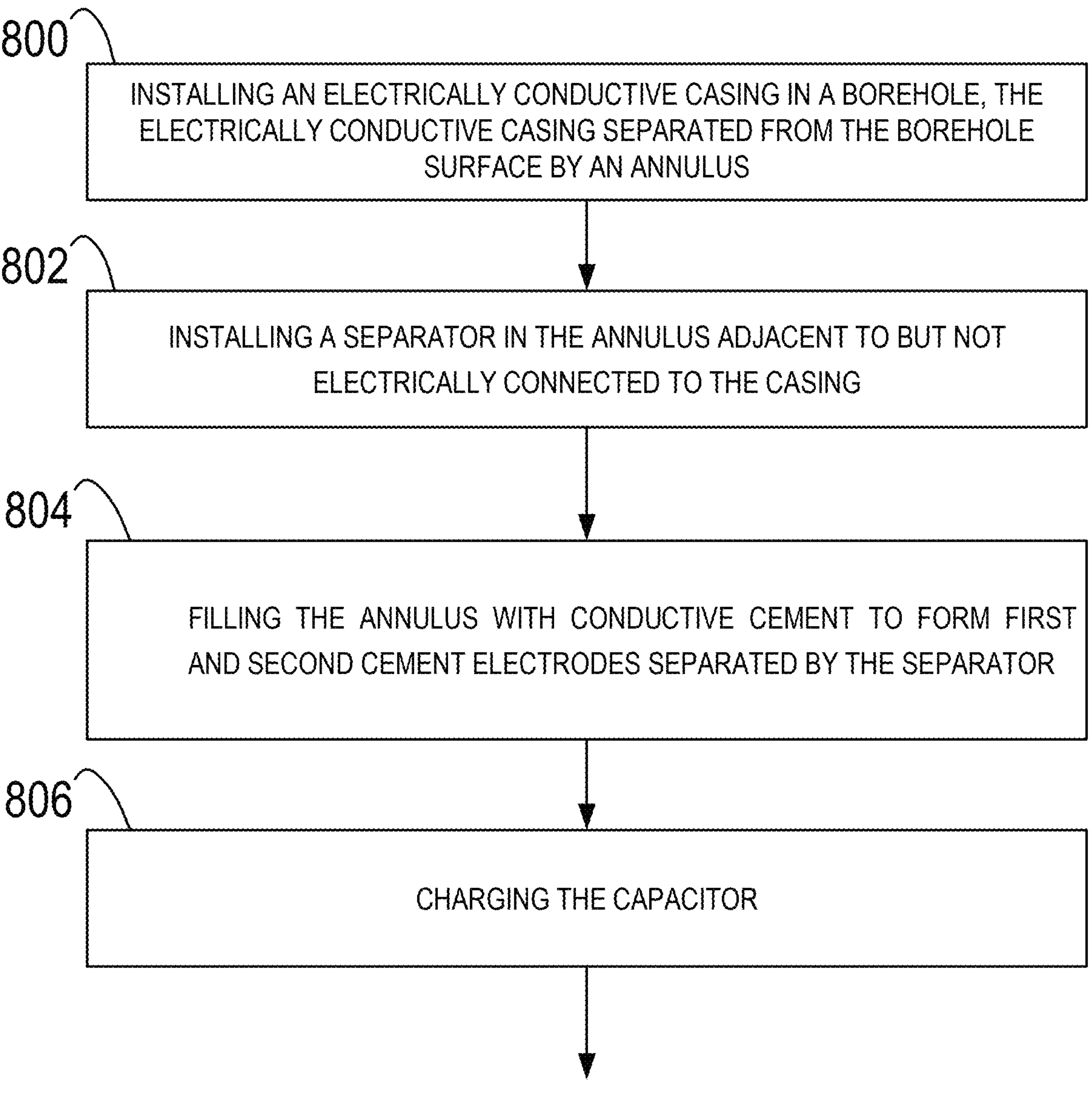
FIG. 8 is a flowchart illustrating a method of charging a cement capacitor, according to aspects of the present disclosure.

FIG. 8 is a flowchart illustrating a method of charging a cement capacitor, according to aspects of the present disclosure. In the example flowchart of FIG. 8, an electrically conductive casing is installed in a borehole (800). The electrically conductive casing is separated from the surface of borehole 118 by an annulus 117. A separator 244 is installed in the annulus 117 adjacent to but separated from the casing (802). The annulus is filled with a conductive cement to form first and second conductive cement electrodes separated by the separator 244 (804). The capacitor is then charged from a load (806).

Figure 9:
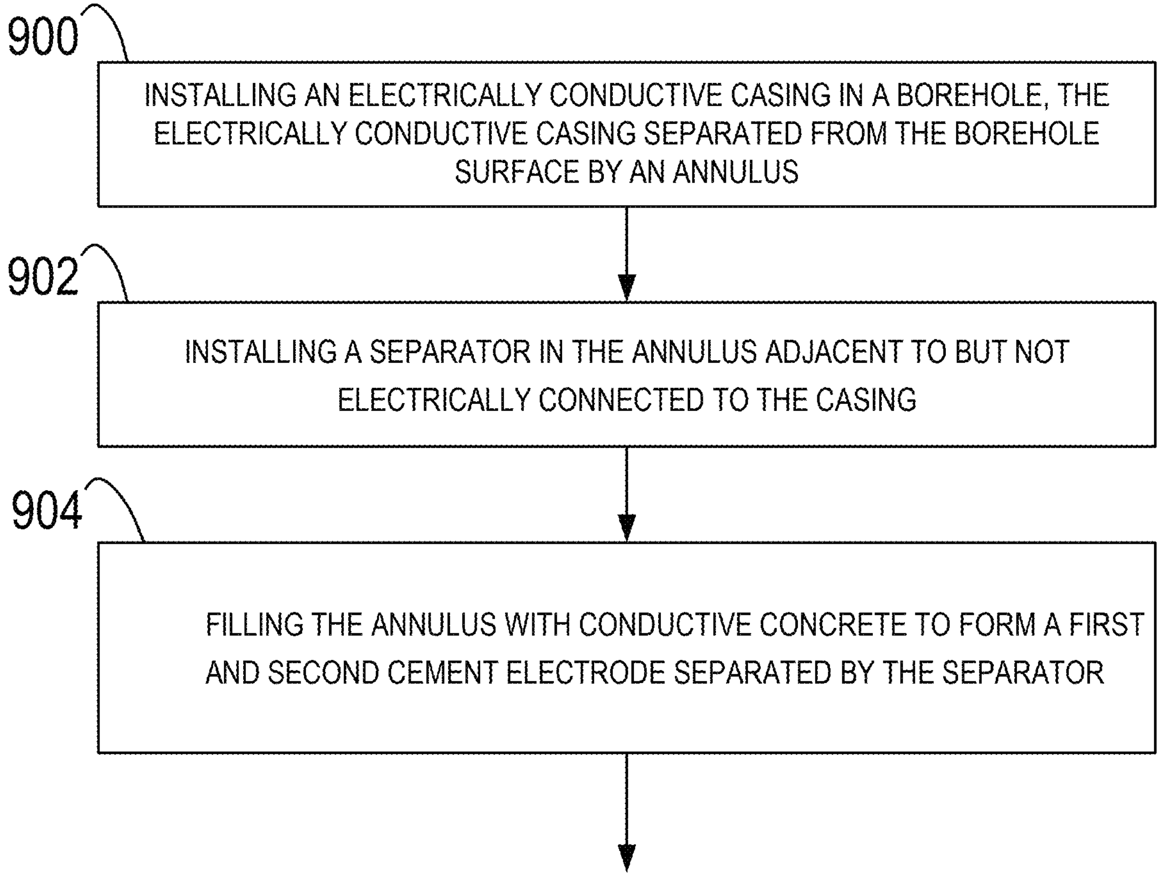
FIG. 9 is a flowchart illustrating a method of forming a cement capacitor, according to aspects of the present disclosure.

FIG. 9 is a flowchart illustrating a method of forming a cement capacitor, according to aspects of the present disclosure. In the example flowchart of FIG. 9, an electrically conductive casing is installed in a borehole (900). The electrically conductive casing is separated from the borehole surface by an annulus 117. A separator 244 is installed in the annulus 117 adjacent to but separated from the casing (902). The annulus is filled with a conductive cement to form a first and second conductive cement electrode separated by the separator 244 (904).

Figure 10:
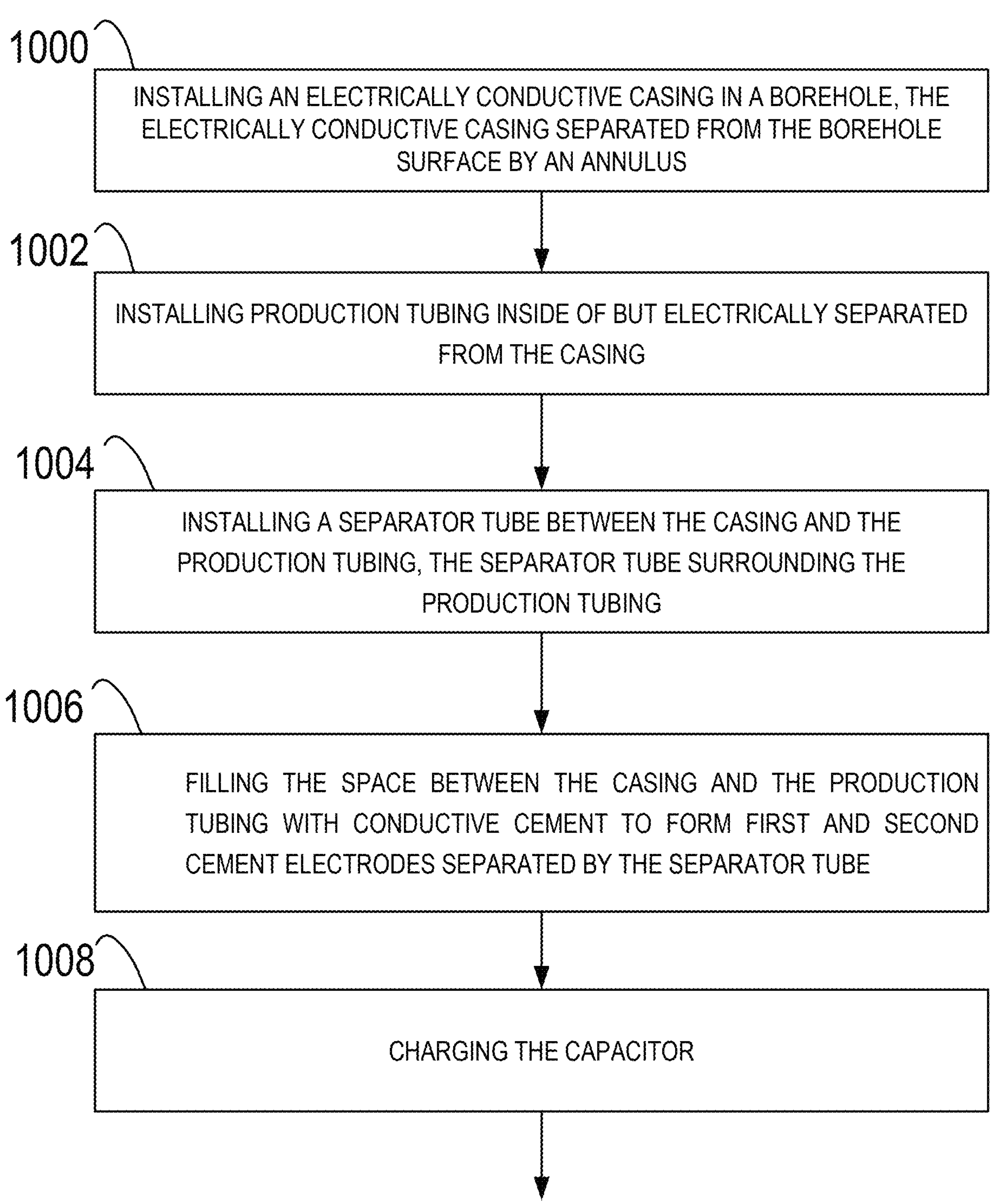
FIG. 10 is a flowchart illustrating another method of charging a cement capacitor, according to aspects of the present disclosure.

FIG. 10 is a flowchart illustrating another method of charging a cement capacitor, according to aspects of the present disclosure. In the example flowchart of FIG. 10, an electrically conductive casing is installed in a borehole (800). The electrically conductive casing is separated from the surface of borehole 118 by an annulus 117. Production tubing is installed inside the casing and is electrically separated from the casing (1002). A separator 244 is installed in between the production tubing and the casing but is electrically separated from the production tubing and the casing (1004). The space between the casing and the production tubing is filled with a conductive cement to form first and second conductive cement electrodes separated by the separator 244 (1006). The capacitor is then charged from a load (1008).

Figure 11:
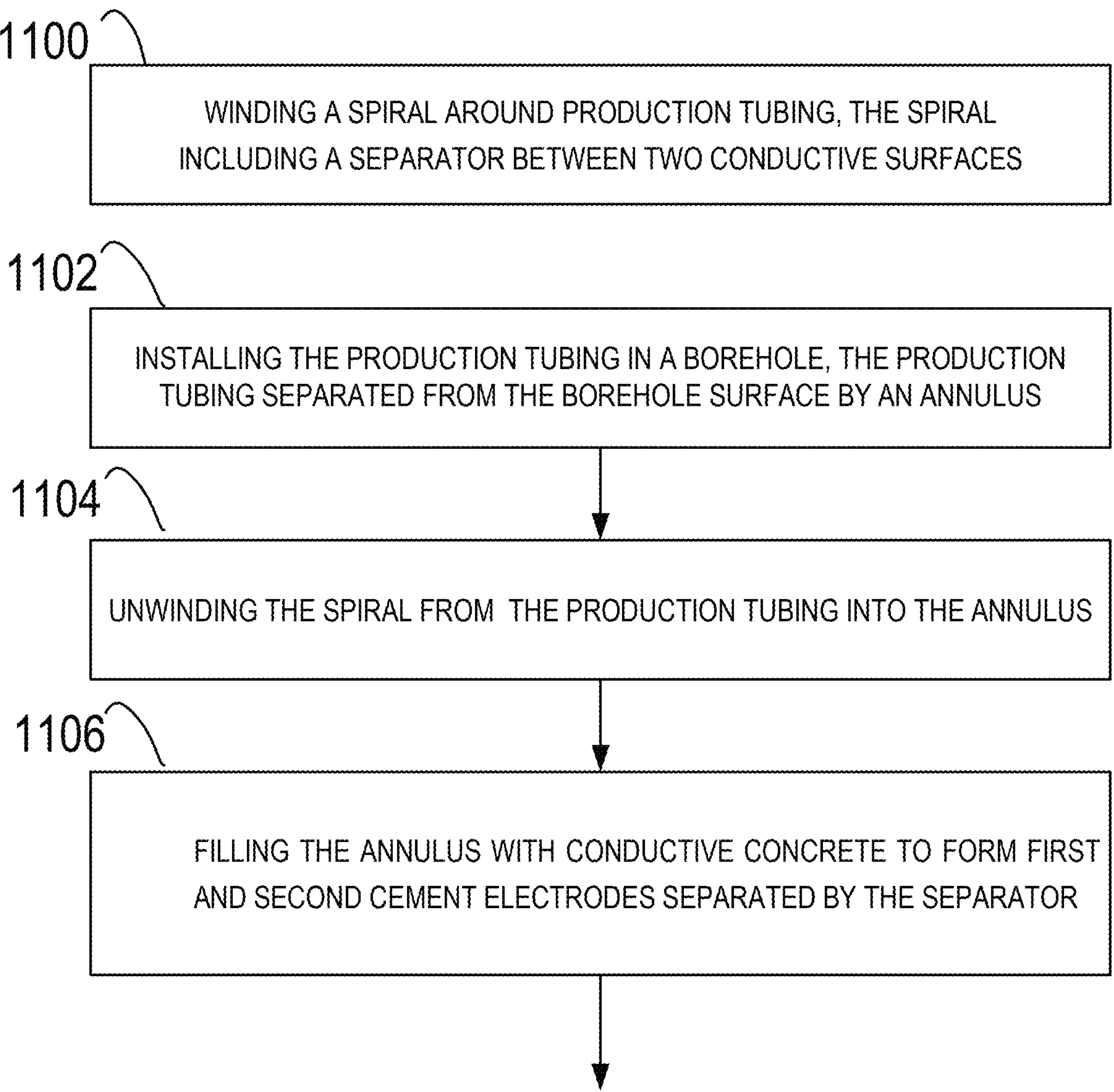
FIG. 11 is a flowchart illustrating another method of forming a cement capacitor, according to aspects of the present disclosure.

FIG. 11 is a flowchart illustrating another method of forming a cement capacitor, according to aspects of the present disclosure. In the example flowchart of FIG. 11, a spiral including two electrically conductive surfaces separated by a separator is wound around production tubing (1100). The production tubing may be conductive or nonconductive. The production tubing is then installed in a borehole 118 (1102). The spiral is unwound so that the two conductive surfaces and the separator spiral into an annulus 117 of borehole 118 (1104). The annulus is filled with a conductive cement to form a first and second conductive cement electrode separated by the separator 244 (1106).

FIG. 12 is a flowchart illustrating another method of charging a cement capacitor, according to aspects of the present disclosure. In the example flowchart of FIG. 12, a load is attached to production tubing (1200). A spiral including two electrically conductive surfaces separated by a separator is wound around production tubing (1202). The production tubing may be conductive or nonconductive. The conductive surfaces are electrically connected to the load attached to the production tubing. The production tubing is then installed in a borehole 118 (1204). The spiral is unwound so that the two conductive surfaces and the separator spiral into an annulus 117 of borehole 118 (1206). The annulus is filled with a conductive cement to form a cement capacitor having a first and second conductive cement electrode separated by the separator 244 (1208). The load charges the cement capacitor (1210).

In general, the cement capacitor is not a very effective capacitor. Its energy density is much less than normal batteries and the cement capacitor will self-discharge over time. On the other hand, there is a large amount of cement in a typical wellbore. The cement capacitor does, however, offset this the lack of energy density with energy storage volume.

In general, maximum voltage of the cement capacitor will be less than the electrolysis voltage in water, 1.23 volts at room temperature and pressure. As pressure increases, the maximum voltage can increase. As temperature increases, the maximum voltage will decrease. At 200 C and 1500 psi, the maximum voltage is 1.07 volts. Temperature is more significant than pressure.

The stored voltage may be positive or it may be negative. The choice depends on the possibility of electrochemical corrosion.

Multiple cement capacitors may be connected together in series so that the resulting system voltage is higher.

The content of the carbon black can vary from 1% wt to 20% wt. Higher carbon content yields more capacitance but also weakens the cement. In one example approach, a 6% wt was a threshold concentration to achieve electrical connectivity in the cement electrode. At 10% wt, the capacitance of the cement capacitor was 20 mF/cm3 for a cement that was prepared at a water-to-cement ratio of 0.6.

The carbon black is dispersed within the cement. In one example approach, the carbon black may be mixed with the dry cement powder prior to mixing with water. Dispersants may be added to reduce the likelihood of the carbon black agglomerating, such adding a superplasticizer.

In one example approach, the cement capacitor uses an ionic brine to carry the current. Water-based wellbore fluids infuse into the cement capacitor and serve as a source for ions. The wellbore fluid can be a completion brine, a cementing brine, or a produced brine. In one application, the wellbore fluid is 3% NaCl brine. It could also be a 15% KCl brine.

In the example provided above, carbon black is used as the additive to the cement. Carbon black has a large surface area and it is inexpensive. In other example approaches, graphene, graphite, single wall carbon nanotubes, multiwall carbon nanotubes, or powered metal may be used. One may also use additives of multiple sizes, such as a bimodal distribution of carbon black, in order to create a conductive pathway at a lower additive concentration. One could also use multiple additives, such as carbon black and MWCNT in order to balance strength, cost, and electrode conductivity.

In one example approach, the porosity of the cement is varied in order to vary the charge rate. A higher porosity cement would allow for easier movement of the ions in the brine. This higher porosity would create a faster rate of charging per volume and a higher power volumetric density while simultaneously reducing strength and energy density.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in a particular order or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations: the described program components and systems can generally be integrated together in a single software product or packaged into multiple software products. Additionally, other implementations are within the scope of the following claims. In some cases, the actions recited in the claims can be performed in a different order and still achieve desirable results.

Example Embodiments

Embodiment #1: A cement capacitor comprising a pipe installed in a borehole: a first cement electrode installed adjacent to the pipe: a second cement electrode: and a separator between the first cement electrode and the second cement electrode, wherein the separator electrically insulates the first cement electrode from the second cement electrode.

Embodiment #2: The cement capacitor of embodiment 1, wherein the cement electrodes are formed from high surface area cement.

Embodiment #3: The cement capacitor of embodiment 2, wherein the high surface area cement includes one or more of carbon black, graphite, carbon nanotubes, charcoal, graphene, metal nanotubes and foamed metal particulates.

Embodiment #4: The cement capacitor of embodiment 1, wherein the pipe is conductive, and wherein the first cement electrode is electrically connected to the pipe and the second cement electrode is electrically connected to ground.

Embodiment #5: The cement capacitor of embodiment 1, wherein the first and second cement electrodes are electrically connected to a first electrical line and to a second electrical line, respectively.

Embodiment #6: The cement capacitor of embodiment 1, wherein the separator is a separator tube installed in the annulus, the separator tube surrounding the pipe.

Embodiment #7: The cement capacitor of embodiment 1, wherein the separator electrically insulates the first cement electrode from the second cement electrode while allowing ions to pass through the separator.

Embodiment #8: The cement capacitor of embodiment 1, wherein the separator is a material selected from a group of materials including a fibrous material, a porous solid material, a nonporous insulating material and a woven material that is partially bonded to a material to increase structural integrity.

Embodiment #9: The cement capacitor of embodiment 1, wherein the first cement electrode is connected to a first electrically conductive surface and wherein the second cement electrode is connected to a second electrically conductive surface.

Embodiment #10: A method, comprising installing a pipe in a borehole, the pipe separated from the borehole surface by an annulus: installing a separator in the annulus: filling the annulus with conductive cement to form a first cement electrode and a second cement electrode, wherein the first cement electrode is located between the pipe and the separator and is electrically connected to the separator, and wherein the second cement electrode is electrically connected to the separator and is electrically insulated from the first cement electrode by the separator.

Embodiment #11: The method of embodiment 10, wherein installing a separator in the annulus includes installing the separator in the annulus adjacent to but electrically separated from the pipe.

Embodiment #12: The method of embodiment 10, wherein the pipe is electrically conductive and wherein filling the annulus includes electrically connecting the first cement electrode to the casing.

Embodiment #13: The method of embodiment 10, wherein filling the annulus with conductive cement includes mixing a conductive material into the cement.

Embodiment #14: The method of embodiment 10, wherein filling the annulus with conductive cement includes pouring the second cement electrode; installing the separator adjacent to the second electrode; and pouring the first cement electrode adjacent to the separator.

Embodiment #15: The method of embodiment 10, wherein installing a separator includes wrapping a first and a second electrically conductive surface separated by separator material around the pipe prior to installing the pipe; and releasing the separator material and the first and second electrically conductive surfaces such that the separator material and the surfaces spiral out from the pipe into the annulus, and wherein filling the annulus with conductive cement includes filling a volume between the separator and the first electrically conductive surface with conductive cement to form the first concrete electrode; and filling a volume between the separator material and the second electrically conductive surface with conductive cement to form the first concrete electrode.

Embodiment #16: An energy storage system, comprising an electrical load: and a cement capacitor electrically connected to the electrical load, the cement capacitor including a casing installed in a borehole: a first cement electrode installed adjacent to the casing: a second cement electrode: and a separator between the first cement electrode and the second cement electrode, wherein the separator electrically insulates the first cement electrode from the second cement electrode while allowing ions to pass through the separator, wherein the cement capacitor is charged by passing electricity to the cement capacitor via the electrical load, and wherein the cement capacitor discharges via the electrical load.

Embodiment #17: The energy storage system of embodiment 16, wherein the cement electrodes are formed from high surface area cement.

Embodiment #18: The energy storage system of embodiment 16, wherein the cement electrodes include carbon black, wherein the carbon black is mixed into the cement for the electrodes before the cement is placed in the borehole.

Embodiment #19: The energy storage system of embodiment 16, wherein the first cement electrode is electrically connected to the casing and the second cement electrode is electrically connected to ground.

Embodiment #20: The energy storage system of embodiment 16, wherein the separator is one or more of a nonporous insulating material, a fibrous material, a porous solid material and a woven material that is partially bonded to a material to increase structural integrity.

What is claimed is:

1. A cement capacitor, comprising:

a pipe installed in a borehole;

a first cement electrode installed adjacent to the pipe;

a second cement electrode; and a separator between the first cement electrode and the second cement electrode, wherein the separator electrically insulates the first cement electrode from the second cement electrode.

2. The cement capacitor of claim 1, wherein the cement electrodes are formed from high surface area cement.

3. The cement capacitor of claim 2, wherein the high surface area cement includes one or more of carbon black, graphite, carbon nanotubes, charcoal, graphene, metal nanotubes and foamed metal particulates.

4. The cement capacitor of claim 1, wherein the pipe is conductive, and wherein the first cement electrode is electrically connected to the pipe and the second cement electrode is electrically connected to ground.

5. The cement capacitor of claim 1, wherein the first and second cement electrodes are electrically connected to a first electrical line and to a second electrical line, respectively.

6. The cement capacitor of claim 1, wherein the separator is a separator tube installed in an annulus, the separator tube surrounding the pipe.

7. The cement capacitor of claim 1, wherein the separator electrically insulates the first cement electrode from the second cement electrode while allowing ions to pass through the separator.

8. The cement capacitor of claim 1, wherein the separator is a material selected from a group of materials including a fibrous material, a porous solid material, a nonporous insulating material and a woven material that is partially bonded to a material to increase structural integrity.

9. The cement capacitor of claim 1, wherein the first cement electrode is connected to a first electrically conductive surface and wherein the second cement electrode is connected to a second electrically conductive surface.

10. An energy storage system, comprising:

an electrical load; and a cement capacitor electrically connected to the electrical load, the cement capacitor including:

a casing installed in a borehole;

a first cement electrode installed adjacent to the casing;

a second cement electrode; and a separator between the first cement electrode and the second cement electrode, wherein the separator electrically insulates the first cement electrode from the second cement electrode while allowing ions to pass through the separator, wherein the cement capacitor is charged by passing electricity to the cement capacitor via the electrical load, and wherein the cement capacitor discharges via the electrical load.

11. The energy storage system of claim 10, wherein the cement electrodes are formed from high surface area cement.

12. The energy storage system of claim 10, wherein the cement electrodes include carbon black, wherein the carbon black is mixed into the cement for the electrodes before the cement is placed in the borehole.

13. The energy storage system of claim 10, wherein the first cement electrode is electrically connected to the casing and the second cement electrode is electrically connected to ground.

14. The energy storage system of claim 10, wherein the separator is one or more of a nonporous insulating material, a fibrous material, a porous solid material and a woven material that is partially bonded to a material to increase structural integrity.

* * * * *